Fig. 1.

INVENTOR
John D. Russell
BY
Charles J. Elderkin
ATTORNEY

March 5, 1968  J. D. RUSSELL  3,371,411
METHOD OF ALTERING THE TEMPERATURE SENSITIVITY OF STRAIN GAGES
Original Filed June 15, 1960  2 Sheets-Sheet 2

INVENTOR
John D. Russell
BY
Charles J. Elderkin
ATTORNEY

United States Patent Office 3,371,411
Patented Mar. 5, 1968

3,371,411
METHOD OF ALTERING THE TEMPERATURE SENSITIVITY OF STRAIN GAGES
John D. Russell, Malibu, Calif., assignor to Microdot, Inc., South Pasadena, Calif., a corporation of California
Original application June 15, 1960, Ser. No. 36,312. Divided and this application Sept. 17, 1965, Ser. No. 510,111
7 Claims. (Cl. 29—613)

This application is a division of application Ser. No. 36,312 filed June 15, 1960, now abandoned.

The present invention relates to improvements in inherently compensated strain gages and to methods for producing the same. More particularly, the invention relates to temperature compensated weldable strain gages; gages which when mounted on a test specimen which is free to expand, will be substantially insensitive to changes in temperature, thus having a very low or zero resistance change with such variations in temperature. The invention further relates to methods for preparing the improved and inherently compensated wire-strain gages described herein.

Resistance wire-type strain gages as originally known were characterized by undesirable sensitivity to temperature variations. In early research and study with these gages the temperature variations were not considered unduly significant for many purposes and thus while temperature compensation was considered desirable, it was not immediately considered critical. However, as the possible areas of utility of such gages were more fully explored, the realization of the difficulties inherent in adapting these initially devised gages for new uses was had. Too, in more recent years an increased demand for gages providing compensation for temperature changes has become necessary by virtue of the testing and development of devices in the rocketry and missile fields, where rapid variations of hundreds or even thousands of degrees are encountered.

The need for temperature compensation of strain gages also arises from physical factors inherent in the gage itself. Thus, the resistance of most materials used in such gages varies with temperature; and a second temperature variable is introduced where the thermal coefficient of expansion of the strain gage wire is different from that of the structure to which it is bonded.

A form of temperature compensation has been attained heretofore in certain instances by installation of a second strain gage, often known as a dummy gage, on an unstrained piece of the same metal as that to which the active strain gage is bonded. If the two pieces of metal are subjected to the same temperatures during testing, compensation is provided for thermal resistance changes in both the test and the dummy gages, for some purposes, even though the active and dummy gages are not inherently compensated. This will be true whether resistance changes occur due to the thermal coefficient of the wire in the gages or to the differential expansion existing between the gages and the metal to which they are bonded. It is noted that this will be true even though both gages have a relatively high sensitivity to temperature, so long as they have the same sensitivity, and, as noted above, are subjected to identical temperatures since the overall effect is cancelled out in the bridge circuit.

Thus, it will be evident that the dummy gage technique does not provide a temperature compensated gage, but rather a temperature compensated system and bridge circuit composed of two or more matched uncompensated gages.

However, merely employing an extra, or dummy, gage in an adjacent leg of a Wheatstone-bridge circuit r modification thereof, in addition to being cumbersome is not enough to ensure complete or even adequate temperature compensation under the increasingly severe test conditions now extant. Thus, full temperature compensation requires that both strain gages, the active and the dummy, be attached to the same structure, and be located as nearly adjacent as possible. Nor will this precaution suffice even in the most standard operating conditions if the two strain gages do not have identical thermal coefficients of expansion, resistance change and the same gage factor; the gage factor being the dimensionless relationship between change in gage resistance and change in length, or strain. Gage factor is, specifically, the measure of the amount of resistance change for a given strain and is thus an index of the strain sensitivity of the gage.

In any event, the dummy gage method of temperature compensation is inadequate and ineffective where rapid and wide variations in temperature are encountered; for the test or active gage and dummy gage in such environments cannot be located in such a manner as to guarantee that the temperatures of the two gages, dummy and test, will be the same under mounted test conditions. Illustratively, if the strain on the skin of a missile is to be measured during re-entry into the atmosphere, the dummy gage cannot be placed directly on the skin because it will sense strain. Further, if the dummy gage were placed in adjacent parallel relation to the test or active gage, it would cancel the reading of the active gage, assuming the latter gage is connected to a bridge circuit, to cancel the temperature effects referred to above. Thus, any high stress or strain in the metal of the missile surface or skin, for which purpose the active gage is applied thereto, would, of necessity go undetected. Placing the dummy gage at right angles to the active strain gage on the missile surface is also ineffective, since unlike a simple tension link, the stresses exerted are complex, and the combined strain in the two divergent directions of stress would induce a single signal of meaningless import, it being unknown as to which of the gages provides which proportion of the total signal transmitted.

It should also be noted that even if the dummy gage could be placed on the missile surface in close physical proximity to the active gage, there would still result significant differences in temperature between the two gages induced by rapid temperature changes and/or variable dissipation caused by underlying structural members. Nor is it practical to attach a dummy gage to a separate unstressed plate of the same metal as that of the test strain gage in the same bridge circuit since attachment to the exterior skin or surface of the missile without making the dummy gage an integral part thereof would result in its subjection to high-velocity passage through the atmosphere and resulting temperature variations widely divergent from those of the test gage. Similarly and obviously no benefit is to be derived from locating a dummy gage within the missile while the test gage is attached to the missile skin.

The above references are illustrative of the existing problems in these fields for which the dummy gage technique is unable to provide the necessary solutions. It will be obvious to those skilled in the art that the problem of temperature compensation under test conditions and related problems as well, also exist in many other areas, such as, for example, in the strain measurement of metals employed in jet-propelled aircraft which are capable of such rapid acceleration and high speeds causing rapid and significant temperature and pressure variations as well as sustained elevated levels thereof in the metal of the plane surface due to air friction and the like; in the construction of jet and rocket engines; and indeed normally wherever substantial and rapid temperature gradients occur.

Hence, in view of the ever increasing severity of test conditions and the inability of the dummy gage technique to provide temperature compensation operative under these conditions, the attainment of an accurate and efficient inherently compensated wire strain gage has evolved into a most significant endeavor.

It should be noted that even in standard, less severe environments where the dummy gage technique referred to above can be employed to better advantage, its effectiveness as an accurate measure of strain is markedly enhanced by substitution therein of inherently compensated gages which provide less "scatter" in temperature sensitivity than gages selected merely as identical in structure and which possess a low temperature sensitivity unlike identically constructed test and dummy gages each of which manifests an elevated temperature sensitivity.

While the inherently compensated gage can always provide, it is observed, an improvement in the accuracy of a dummy gage system, employment of the dummy gage system known heretofore will not improve the accuracy of the measure derived from use of an inherently compensated wire strain gage. Indeed, where the dummy gage and active gage temperatures are widely divergent, a circumstance which can so readily occur in the increasingly severe conditions of test and development studies, the added number of variables resulting would succeed only in introducing error into the measurements obtained by virtue of such ill advised usage.

Inherently temperature compensating wire stain gages, often referred to as self-temperature compensating, have been known heretofore. These have been of the bonded variety wherein the resistance wire is bonded by means of cement, glue, cellulose, Bakelite resin or a similar adherent material to the surface of a sheet of insulating material such as paper. The paper insulating support is, in turn, bonded to the test specimen in which strain is to be measured. In these gages the fine wire resistance filament is disposed as a grid and composed of two different materials; for example, a copper-nickel alloy and nickel connected in series. The lengths of the two different wire materials are proportioned so that the total increase in resistance with temperature, due to both the coefficients of resistivity and thermal expansion, of one material, e.g. copper-nickel alloy, is to a large extent cancelled by a decrease in the resistance of the other material, e.g. nickel. Since the temperature coefficient of expansion varies with different materials, it is, of course, necessary to select the proper gage for the material being tested. Gages of this type are presently used on materials having the temperature coefficients of expansion of annealed mild steel and 24ST6 duraluminum. Illustratively, a difference in coefficients of expansion of $1 \times 10^{-6}$ per degree Fahrenheit (per deg. F.) results in a gage indication of 1 micro-inch per inch per deg. F. One difficulty inherent in these gages has been their limitation for use within comparatively narrow temperature ranges in terms of the test conditions where stress gages are used or needed. Thus, these gages are excluded from use for the majority of demanding test procedures employed in the fields of aerodynamic, jet, missile and rocketry research and development. Illustrative of the temperature ranges within which these compensating strain gages known heretofore are purported to have some value are $+50°$ F. to $+250°$ F. and from $-50°$ F. to $+300°$ F. From curves purporting to further characterize these gages it appears that the margins of error embraced within the narrower range may be as much as 50 micro-inches per inch while for the broader range recited the error may extend to in excess of 300 micro-inches per inch. Temperature use limitations are also introduced by the nature of the bonding material employed. A still further difficulty with this type of gage is that once manufactured the gage cannot be readily or conveniently adjusted; nor can it be given an accurate unmounted sensitivity calibration; nor indeed can a check on temperature compensation or temperature sensitivity be effected after mounting thereof on a specimen to be tested, in most instances.

Thus, there is no accurate correlation between unmounted and mounted sensitivities.

It will, for example, be evident that temperature compensation of a strain gage cannot be accurately determined after it is mounted on a complex test specimen where the degree of restraint with temperature change is a complex and normally indeterminable factor. Thus, if the test specimen is temperature calibrated after gage installation the gage resistance change may be due to one or a plurality of strains; e.g. to strains induced by free expansion or strains caused by thermally induced stresses; with no means for determining which proportion of the measured signal is caused by one or another of these strains.

Thus, in accordance with the present invention there is provided an inherently temperature compensated wire filament weldable strain gage wherein temperature compensation and calibration have been reliably and accurately introduced prior to mounting of the gage on a metal piece or test specimen; thus effecting the preparation of a gage which more efficiently measures strains occasioned by stresses introduced into test specimens whether these stresses are induced by thermal effects as where a metallic test piece is restrained, in which case the gage is desirably sensitive to temperature modification; where such changes cause a stress on the piece or structure tested; or where these stresses on the test specimen are introduced by pressure, force, acceleration or the like.

To accomplish these and other objectives of the present invention there is provided a wire strain gage which, when mounted on a test specimen which is free to expand, will have a very low or zero resistance change with changes in temperatures; in effect, a gage made insensitive to strain or elongation; a state attained only in a gage wherein the metal expands freely with increasing temperature.

Such strains, referred to as free thermal expansion strains, are not, however, the only factors required to be eliminated or cancelled in order to provide a meaningful temperature compensated gage. Other and interrelated factors upon which temperature compensation depends are the thermal coefficient of resistivity and the thermal coefficient of expansion of the wire.

These factors, noted to illustrate the selectivity and delicacy of the problems inhering in formulating a gage of dependable mounted sensitivity prior to mounting, can, however, be counteracted by altering the thermal coefficient of resistivity or the thermal coefficient of expansion of the wire filament of the gage. Attempts to provide a compensated gage by balancing of these factors has been attempted heretofore. However, a practicable basis for effecting this on individual gages has not been known hitherto. Thus, the known procedures employ a batch or spot system of selection. This practice involves selection of a spool of wire sufficient to form a large number of gages with the supposed correct coefficient of resistivity, from which a batch of gages theoretically compensated for a metal with a particular coefficient of expansion is then formed. This procedure has been found, however, is introduce a very large and significant amount of error, for there exists a surprisingly intolerable scatter or variation in the actual sensitivities of the gages made from even the most uniformly constituted spool or similar length of wire. Thus, the differences in sensitivity between two or more gages so constructed and prior to mounting thereof on a test specimen have been found to be as much as 1000 micro-inches per inch of apparent strain for a temperature change of 500° F. This would correspond to an erroneous stress measurement of approximately 30,000 p.s.i. in steel. Thus, these batch systems known heretofore when employed with the bonded gages, prepared as described above, result in compensating gages with an intolerable scatter or variation over any temperature range akin to that which they would experience in modern test conditions. A further disadvantage resides in the fact that these bonded gages cannot be readjusted for another test material once they have been prepared, even were no scatter inherent therein. This is more commonly due to the method of bonding of the wire filament to its support and the bonding of the support itself to the test specimen. Thus the adherent or bonding agent has only a limited tolerance for variations in temperature before attaining a final set which cannot be disturbed without destroying the usefulness of the gage and indeed the gage itself.

The present invention provides, therefore, a weldable resistance wire filament strain-gage duly and accurately calibrated and compensated for temperature prior to its mounting for use on a test specimen; a gage which, in addition, can be readjusted in its temperature compensation repeatedly should it be decided to use a particular gage or plurality thereof with test material other than that for which it was originally prepared. Further, it is feasible in accordance with the present invention to check on the sensitvity of each individual gage prepared prior to removal thereof from the calibration and adjustment device and thus, of course, prior to mounting thereof in a test procedure. Still further, the adjustment, readjustment and calibration of individual gages is accomplished, in accordance herewith, in a manner both rapid and economically practicable.

Briefly, the method of producing inherently temperature compensated gages of the class herein described involves establishment of such a gage at an elevated temperature; sensing and measuring the temperature sensitivity of said gage at the elevated temperature, and passing an electrical current through the filament of said gage sufficient to effect a permanent shift in temperature sensitivity therein with reference to its indicated or measured value. While the shift effected is indeed permanent, it is noted that the resulting temperature sensitivity of the gage can be again altered if desired by employing the procedure described herein to adjust the initial modification of temperature sensitivity of said gage.

It will be apparent, therefore, that it is also feasible although unnecessary, to employ a batch system in the preparation of the temperature compensated strain gages of the instant invention whereby a spool of wire having an announced thermal coefficient of resistivity may have imparted thereto an average sensitivity irrespective of the intolerable scatter which occurs, so that the fine adjustment in sensitivity required by the individual gage subsequently will be held to a minimum, even though such adjustment can be made over a wide range. In this manner, too, some of the gages of the batch may even attain the desired sensitivity. The remaining gages of the batch or group can then be individually adjusted; a procedure which could not be performed with the temperature compensated gages employed heretofore.

In general, the gages calibrated and compensated for temperature and used in the practice of the present invention are the weldable strain gages described in copending United States patent application Serial No. 754,956 filed August 14, 1958, now Patent No. 3,245,018 issued May 5, 1966, by the inventor herein and of which the present application is a continuation-in-part. These gages are adapted for coupling or attachment to the test specimen either with or without the use of temperature sensitive adherents. These gages have the further advantage of being well adapted for use under extreme temperature conditions as well as for use at ambient temperatures. Further, the gages of the invention are well suited for use with test specimens having curved or irregular surfaces and are, in addition, attachable to the test specimen in such a manner as to effect a strain responsive coupling over the entire length of the resistance filament contained within the gage, and most significantly, without the use of cements or other sensitive bonding materials. Thus, these strain gages can be welded to the test specimen, either by application of normal electrical spot welding techniques or by means of sonic welding as well as soldering or brazing.

In generalized form, the gages employed herein comprise a resistance wire or strain-responsive filament of conductive or semi-conductive material carried by a supporting element, such as an external housing of metal, and mechanically locked to the supporting element by means of a dense mass of insulating material in such fashion that longitudinal changes in the dimension of the supporting element caused by deformation of a test specimen to which it is attached are imparted to the resistance wire or filament via the mass of insulating material. Thus, for example, the insulating material may be a compactible or compressible solid possessing both thermal and electrical insulating properties, which is deposited around the filament and enclosed within a metallic tube permanently deformed, as by drawing, crimping, etc., to exert a compressive force on the insulating material, thereby forcing it into firm compressive contact against the resistance element and effectively frictionally coupling the element to the external tube. Accordingly, with the tube attached along its entire length to a test specimen, strain applied to the tube from the test specimen is transmitted through the insulating material and hence to the resistance element contained therein.

The external housing of the gage is formed of a freely-yielding or deformable material such, for example, as thin sheet steel, stainless steel, platinum, aluminum, tungsten, tungsten alloys, etc., which is readily adaptable for rigid bonding, as by welding, to a metallic test specimen. In this manner, the gage can be securely fastened to a test specimen very quickly without the necessity of waiting for a bond to set or cure as in the conventional types of bonded gages referred to hereinabove. The unique structural characteristics of the gage permit its being mounted by welding over its entire length to either a flat or curved surface and without danger of damaging or shorting the internal resistance wire or filament which is electrically insulated from the housing by the surrounding mass of insulating material, and also render the gage adaptable for high temperature measurement work due to the thermal insulating properties of the assembly, as well as measurement work performed under ordinary or ambient conditions of temperature.

In order that the invention may be readily understood reference is had to the accompanying drawings, forming part of this specification, and illustrating, by way of example, certain apparatus embodying the invention and by which the method of the invention is carried out. In these drawings.

Figure 1:
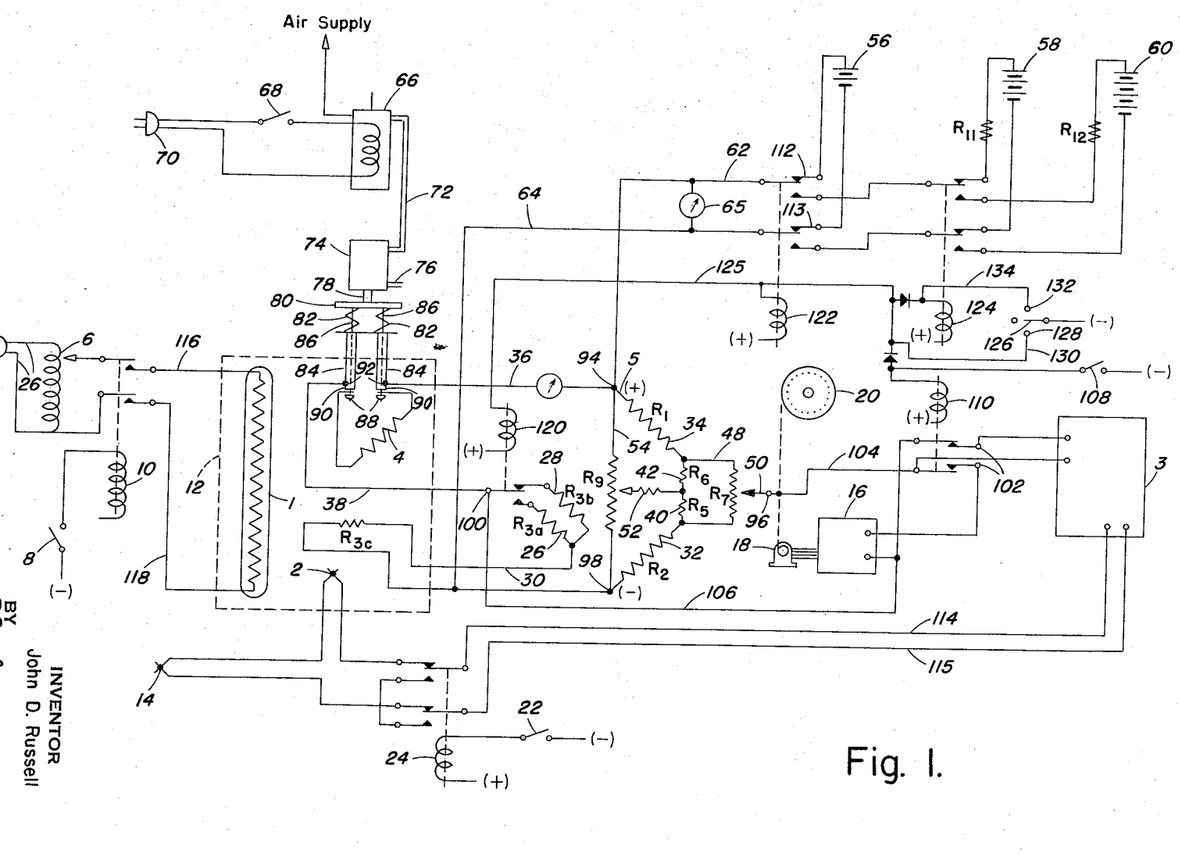
FIGURE 1 is a plan view schematically illustrating the gage sensitivity calibrating system and gage sensitivity adjusting system of the present invention.

Referring with greater particularity to the drawing, FIG. 1 illustrates diagrammatically the means for calibrating and adjusting temperature compensating wire strain gages of the class referred to and described herein, and comprises the circuit arrangement and apparatus employed for this purpose.

The calibrating system considered broadly comprises a quartz lamp 1, a thermocouple 2 actuating the X-axis of an X–Y recorder 3 for measuring temperature, and effecting calibration of the sensitivity of the wire strain gage 4 which is removably inserted as discussed in detail hereinafter in a bridge circuit indicated in its entirety by the numeral 5 fed by direct current to actuate the Y-axis of the X–Y recorder 3. In this manner a plot of resistance change in relation to change in temperature is effected.

The quartz lamp 1 is operated by a variable transformer (Variac, a tradename) 6 by means of the switch 8. The lamp 1 itself is positioned in a sheet metal oven 12 (indicated by the dotted line) made of stainless steel. The lamp 1 is capable of elevating the temperature of the oven 12 from ambient temperature to about 600° Fahrenheit (F.) in a very brief period of time (about 50 seconds) and is capable, as well, of attaining temperatures of 1000° F. (oven). The thermocouple 2 formed of iron-constantin alloy is disposed within the oven 12 for the purpose of measuring the temperature therein. A second iron-constantin thermocouple 14 is immersed in an ice bath to effect a reference junction for the monitoring thermocouple 2. The signal from the thermocouple 2 goes into the X-axis terminal of the standard X–Y plotter or recorder 3 and employs a conventional chopper type amplifier, for example, a Standard Brown Electronic Potentiometer Amplifier manufactured by Minneapolis-Honeywell Corp. and a two phase motor manufactured by Minneapolis-Honeywell Corp., both of which are present in the recorder 3, but not otherwise shown in FIG. 1. The motor is driven by signals from the amplifier and, in turn, actuates the X motion of the recorder pen in accordance with the temperature conditions. The heating system is operated in such a manner that when an X–Y plot is to be initiated the switch 8 is closed, which in turn closes the contacts of the relay 10 which then passes an alternating current voltage through the plug and cord 5 and the variable transformer 6 to the quartz lamp 1, from a suitable current source. Also present in the recorder 3 are a second amplifier (not shown) and a second two phase motor (not shown) of similar or substantially identical structure to that described above. This second amplifier and motor serves to operate the Y-motion of the X–Y plotter as described elsewhere herein. The third set of amplifier and motor actually shown diagrammatically and indicated by the numerals 16 and 18 respectively are employed to effect and indicate balance in the bridge circuit 5 as described in detail hereinafter.

Temperature measurement is accomplished, as noted above, by means of the thermocouple 2, which is fabricated of very small iron-constantin wires so that it will be able to follow the rapid temperature changes involved. It is also attached to an otherwise inactive dummy strain gage shell. This attachment contributes to a duplication of the temperature conditions existing in the actual gage 4 present in the bridge circuit 5. The output from the thermocouple 2 is transmitted directly to the highest sensitivity of the X-input of the X–Y recorder 3. A small millivolt source from the thermocouple 2 moves the pen of the recorder from left to right as the temperature is increased. The recorder 3 is of standard construction; its circuitry being substantially that of the Standard Brown Electronic Potentiometer Amplifier referred to herein-above and indicated by the numeral 16. The recorder 3 has a zero reference adjusting means (not shown) to assure the correct starting point for each X–Y plot. The adjustment of the recorder 3 to a reference or zero adjustment is effected by means of the switch 22 and the relay 24. Thus, when the switch 22 is closed the contacts of the relay 24 are also closed, and the X-input to the recorder 3 is thus shorted. The X-input is, as a result, zero under these conditions. The voltage input, it should be noted, is the same, consequently, as that which would exist if the temperature at the measuring thermocouple 2 disposed in the oven 12 were identical with that of the thermocouple 14 of the reference junction. This means that since the reference junction 14 is at 32° F., a zero voltage corresponds to 32° F. at the monitoring thermocouple 2. Therefore, when the switch 22 and the corresponding relay 24 are closed, the adjustment or balancing means of the recorder 3 referred to above, should be modified so that the pen is at the base point indicating a temperature of 32° F. on the chart of the recorder 21.

The temperature sensitivity of the X-axis is established through the use of known voltages and thermocouple voltage charts.

While the X-axis thus records the temperature in the manner described, the Y-coordinate is the measure of apparent strain, and this measurement is obtained by insertion of a gage 4 of the class described hereinafter into the bridge circuit 5, supplying the bridge with a conservative direct current voltage and connecting the bridge output to the Y-axis input of the X–Y plotter 3. This bridge system 5 also constitutes the principal portion of the strain gage sensitivity adjustment system.

The term "apparent strain" employed herein refers to the resistance change accompanying temperature change. A temperature sensitivity is more readily analyzed in such a manner since the instruments used normally with the gage read directly in strain and any unmounted temperature induced errors can be quickly evaluated in relation to stress problems without concern for making the necessary calculations from resistance change to strain through the use of gage factors. In addition, a standard strain sensing instrument can be used for temperature calibrations. If desired, of course, the actual resistance values are readily calculated from apparent strain values through the use of the formula:

$$G = \frac{\Delta R/R}{E}$$

wherein:

G = gage factor
E = strain (apparent strain)
R = resistance

The bridge circuit 5 comprises fundamentally the arm composed of the gage 4 constituting the resistance $R_4$ which is to be calibrated and adjusted in the oven 12; the arms 26 and 28, the resistance elements of which are identified as R–3a and R–3b respectively; the extension of this arm, the conductor 30, containing the resistance element R–3c which extends into the oven 12; and the precision resistor arms 32 and 34 constituting the resistances $R_2$ and $R_1$ respectively. It should be noted that the resistance values $R_2$ and $R_1$ identified by the numerals 32 and 34 respectively in the bridge 5 are not critical except that they must be matched and must be of sufficient resistance and wattage to prevent excessive current drain and damage to the resistors. Thus, the resistance values employed normally, although not narrowly critical, are of about 250 ohms. The arm 26 is a weldable strain gage of the class described elsewhere herein for use in the practice of the present invention. It is, however, used as a dummy gage and functions to give temperature stability during X–Y plotting on the recorder 3. When, however, the gage 4 is being adjusted and is thus subject to high voltages, as will become apparent from our discussion hereinafter, the arm 28 containing the resistance R–3b is substituted for the resistance R–3a so that the dummy gage is not shifted or damaged during this adjustment. The resistance R–3b in the arm 26 is a high wattage wire resistor of approximately the same resistance value as that of R–3a in the arm 28. The conductor 30 containing the resistance R–3c is extended into the oven 12 for the purpose of cancelling out the temperature effects on the lead wires 36 and 38 which connect the gage 4 in the oven 12 to the remainder of the bridge 5.

The arms 40 and 42 are disposed between the precision resistor arms 32 and 34. These former members 40 and 42 include the resistance elements R–5 and R–6 respectively. These elements have normally a resistance of 1 ohm each and serve to establish the sensitivity of the amplifier 16 and its dial 20.

Thus, the resistance elements 40 and 42 carrying the resistances R–5 and R–6 respectively, establish the range of voltage across the lead element 48 containing the resistance R–7 to the slide wire contact 50. The resistance R–7 is normally in the order of about 40 ohms. In this manner, the resistance elements R–5 and R–6 determine how far the aforesaid slide wire contact 50 must move to re-establish a zero voltage between this contact point and the opposite corner of the bridge circuit 5 as defined by the nexus of the lead wire 38 with the dummy gage 26 containing the resistance R–3a. The elements 52 and 54 containing resistances R–8 and R–9 respectively are conventional bridge balancing resistors used to adjust and eliminate any initial unbalanced conditions in the bridge 5 and to set the dial 20 of the visual indicating system at a predetermined starting point as desired.

The batteries or power sources 56, 58 and 60 can be interchanged for one another in the system as seen in FIGURE 1. The source 56 serves to energize the bridge circuit described above when an X–Y plot is being made and when the dial 20 of the potentiometer 16 is being used to obtain the initial ambient temperature resistance of the gage 4. The power sources 56, 58 and 60 are in contact with the bridge circuit through the lead wires 62 and 64. The power source 58 energizes the bridge circuit 5 when the gage 4 is to have its temperature sensitivity adjusted downwardly. The battery or power supply 60 is in turn connected to the lead wires 62 and 64 when voltage is required to energize the bridge in such a manner that the gage 4 in the aforesaid bridge 5 will have its temperature sensitivity adjusted upwardly. A voltmeter 65 is maintained across the lead wires 62 and 64 to provide a measured indication of the voltage emitted from the power sources 56, 58 and 60. The actual adjustment of the gage 4 is accomplished not on the basis of voltage across the gage 4 but rather on the basis of current in the filament of the gage. The second and third voltage power supplies 58 and 60 may be so disposed as to provide a current which is constant through the gage filament rather than imparting a constant voltage across the bridge circuit. Preferably, however, rather than effecting constant current supplies to the bridge 5, the variations in resistance between successive gages 4 positioned in the bridge 5 for calibration and adjustment, can be accomplished by starting with higher voltages in the power sources 58 and 60 and inserting series resistors R–11 and R–12 respectively in the leads therefrom. Suitable resistances in these latter elements will be in the range of 3000 to 5000 ohms, although this range is not narrowly critical.

At this point and prior to a detailed description of the remaining elements of the system circuit as seen in FIGURE 1 and the operation of the system to accomplish its principal objectives of calibration and adjustment, brief but detailed reference to the clamping means is appropriate. The clamping means provides a convenient method for insertion of the gage 4 in position in the bridge 5 to constitute the resistance R–4 for purposes of calibration and adjustment. This clamping means comprises a solenoid actuated air valve 66 which is energized by closure of the switch 68 connected to a current source by means of the cord and plug 70. When so energized, approximately 100 pounds per square inch (p.s.i.) of air pressure is passed from an air supply (not shown) through the air line 72 to the cylinder 74. When deenergized by opening of the switch 68, the air valve 66 is closed and a port 76 opened to permit air pressure in the air cylinder 74 to be bled off.

The air cylinder 74, when pressurized, forces the piston 78 and the spring-biased terminal disc or cross-member 80 affixed to the lower end of said rod 78, downwardly, thus compressing the spring elements 82 against the tube members 84. Through these latter tube members 84, each of which defines a passage into the oven 12, are conducted the wire clamp attachment means 86 which are suspended from the under face of the disc 80. These wire elements 86 terminate in and support the clamping members 88 which are lowered out of clamping engagement with the terminal ends 90 of the tubes 84, when the air cylinder 74 is pressurized.

When the switch 68 is open and thus the air valve 66 is closed, and the air cylinder 74 not pressurized, the rod 78 and disc 80 are raised as are the wire elements 86 causing the clamping members 88 to ascend into clamping engagement with the terminal perimeters 90 of the tube (84) orifices. Prior to effecting this clamping engagement there is inserted between the clamping components 88 and 90 the opposite ends of the gage 4 forming an arm of the bridge circuit 5 which is to be calibrated and adjusted by the procedure of the present invention. These clamping components 88 and 90 are formed desirably of gold to avoid slippage of the gage 4 engaged thereby. The terminal ends of the gage 4 or suitable lead wires connected thereto form contact with the terminals 92 of the bridge lead wires 36 and 38 when in clamped position in the sheet metal oven 12.

The remaining portion of the bridge 5 exclusive of the lead wire 30 is disposed outside of the oven 12. The corners of the bridge are identified by the numerals 94, 96, 98 and 100. The bridge terminals 94 and 98 represent the power or input connections for energizing the bridge 5. The corner terminals indicated by the numerals 96 and 100 represent the output signal from the bridge. In general the bridge system 5 is concerned with the connection of one of three voltages from the batteries or power sources 56, 58, and 60 to the input terminals 94 and 98 and with the connection of the plotting system of the Y-coordinate on the recorder 3 to the terminals 96 and 100. It will be seen that this connection is established through the relay system 102 to the conductors 104 and 106 which connect with the bridge terminals 96 and 100 respectively.

When a gage 4 is clamped in position in the oven 12 and the oven door (not shown) closed, the switch 108 is also closed, thus closing the relay 110. All other relays are at this point open. As a result the battery or power source 56 is connected to the bridge input terminals 94 and 98 by means of the closed contacts 112 and 113 of relay 122 with the conductors 62 and 64 respectively. The amplifier 16 is at this time connected to the bridge output terminals 96 and 100. The amplifier 16 causes the motor 18 to drive the slide wire contactor 50 to a null position and causes the dial 20 of the amplifier 16 to indicate the resistance of gage 4 which may be noted on the graph of the recorder 3. After a balance is reached the switch 108 and relay 110 are opened.

It should be noted that the positioning of the slide wire contactor 50 serves another purpose in providing an automatic bridge balancing system for use in conjunction with the X–Y recorder 3. Thus, regardless of the gage being tested, the pointer or contactor 50 is always positioned to where the bridge output voltage is essentially zero. This means that when plotting, there will always be a minimum of final adjustment to be done by the Y-axis adjustment member of the X–Y recorder 3. An X–Y plot is then initiated by activation of the X–Y recording 3 by means of an internally disposed switch therein (not shown) and includes placing the pen up or down on the recorder (3) graph. The switch 22 is then closed momentarily actuating the relay 24 to the closed position and shorting out the "X" axis input while the X reference adjustment is made. The switch 2 is then reopened connecting the thermocouples 22 and 14 to the X-coordinate recording system through the conductors 114 and 115. The switch 8 and relay 10 are also closed to cause current to be passed into the conductors 116 and 118 to energize and heat the quartz resistance element 1 in the oven 12. The recorder 3 is adjusted concomitantly as described above.

The temperature monitoring thermocouple 2 positioned in the oven 12 furnishes the signal to move the pen to the right on the X-axis to record the temperature of oven 12. The strain gage bridge voltage connected to the bridge at the terminals 94 and 100 is connected to the Y-axis so that changes in resistance with temperature rise in the oven 12 activate the pin in the Y direction in proportion to resistance change or apparent strain and the X–Y plot or graph is thus effected. During this operation each of the relays 110, 120, 122 and 124 along the conductor 125 are open. Thus the potentiometer 16 is not connected during this operation because the contact formed at the relay 102 is open. The initially established ambient temperature null point of the slide wire relay 50 at the bridge terminal 96 is thus maintained. It is noted that a conservative bridge voltage, preferably from one to five volts, is used during plotting of the X–Y coordinates so that the temperature sensitivity of the gage 4 will not be changed during this step.

After the X–Y plot is completed or partially completed, the sensitivity of the gage 4 is adjusted upwardly or downwardly by operation of the switch 126. If a downward adjustment in sensitivity is required, the leaf or switch 126 is actuated to contact the terminal 128 of the conductor 130 to close the relays 110, 120 and 122, thus connecting the power source 58 to the bridge input terminals 94 and 98, and thus effecting a lowering of the temperature sensitivity in the gage 4. The resistance, of course, in the gage 4 is raised when the temperature sensitivity is decreased and vice versa.

During this opertaion it is noted that since the relay 110 is closed, the X–Y recorder 3 is disconnected and the potentiometer 16 is connected through the contacts at 102 so that changes in the resistance balance of the bridge 5 are recorded on the dial 20. An initial rise in temperature of the gage 4, including the resistance R–4, in the furnace or oven 12, is reflected in the dial figure and may be disregarded. The dial figure indicating adjustment is actually had after the gage 4 is stabilized at the elevated filament current temperature. The switch 8 is open during this adjustment or curing phase and the quartz lamp 1 is thus non-energized.

When the desired modification of the temperature sensitivity of the gage 4 has been effected the leaf or switch 126 is opened to assume a neutral or "off" position. After the gage 4 has cooled, the switch 126 and relay 110 are again closed and another reading of ambient temperature resistance obtained from the dial 20. In comparing this "after" reading witth the "before" reading, it can be concluded as to whether a sufficient adjustment in resistance has been introduced to yield the proper temperature sensitivity change. In some instances, after viewing the "before" and "after" resistance of the gage, it may be concluded to forego a second X–Y plot, but to go directly to a second adjustment or curing cycle and thus effect a still greater modification in resistance; after which a plot will then be made on the X–Y recorder 3. This procedure is repeated until sensitivity is correct and accords with the known values of the test specimen to which the gage 4 is to be attached. It should be noted that, while the "before" and "after" resistance readings are more accurate, the actual shift in resistance can be observed during the raising or lowering operation after the initial shift due to rise in temperature is disregarded.

Where the sensitivity of the gage 4 is to be raised rather than lowered the procedure, of course, is somewhat different. In this latter circumstance the switch 126 is actuated to contact the terminal 132 of the conductor 134, closing the relays 110, 120, 122 and 124. It will be noted that as a result, with both of the relays 122 and 124 closed, the power source 60 is now connected to the input terminals of the bridge 94 and 98 and a voltage of even greater magnitude than that emitted by the battery 58 is thus conducted to the bridge input terminals 94 and 98.

The plotting procedure employing the potentiometer 16 and the X–Y plotter 3 are the same whether the gage sensitivity is being raised or lowered. Of course, the resistance is depressed when the temperature sensitivity is being increased, and elevated when the temperature sensitivity is lowered.

It will be noted as described hereinabove that in both instances where the gage temperature sensitivity is being adjusted, the relay 120 is closed so that the arm 28 containing the high wattage wire resistor 3b, is substituted for the lesser resistance R–3a of the dummy gage 26. When the ambient temperature resistance of the gage 4 is to be noted or when an X–Y plot is being made, the relay 122 is open and the votlage of the source 56 is then conducted to the input circuit of the bridge 5.

Figure 2:
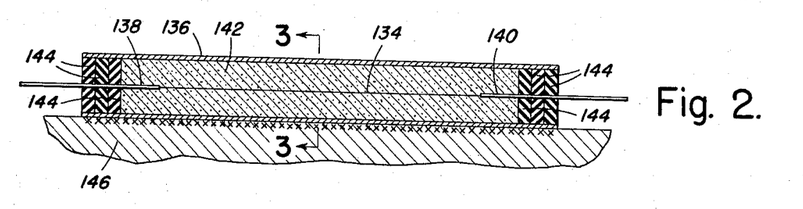
FIGURE 2 is a longitudinal sectional view of a typical strain gage employed in the practice of the invention and shown in operative position with respect to a test specimen.
Figures 3, 5:
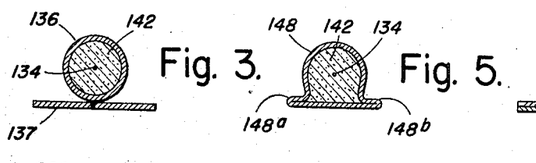
FIGURE 3 is a sectional view taken along line 3—3 of FIGURE 2, illustrating at the same time the preferred modification of the present invention.
FIGURES 5 and 6 are transverse sectional views illustrating, in cross-section, two modified forms of strain gage embodying the principles of the gages for use in the present invention.
Figure 4:
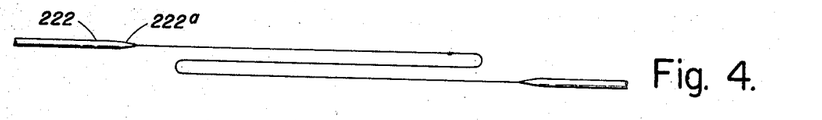
FIGURE 4 is an elevational view of a modified form of resistance element useful in the device of FIGURE 2 as well as in other gage structures of the class employed herein.

The basic embodiment of the strain gage 4 employed in the practice of the present invention is illustrated in FIGURES 2 and 3. Gages of this class are unique in that they are weldably attachable to the test specimen along the entire effective length of the strain-responsive filament contained within the gage 4 and preferably along the entire length of the gage housing. As illustrated in FIGURE 2, the gage comprises a fine strain-responsive resistance wire or filament 134 coaxially disposed in an elongated tube or similar external housing 136 with the ends of the filament wire terminating within the tube. A pair of larger lead wires 138 and 140 are welded, soldered or otherwise attached to the ends of the aforesaid wire filament 134. Alternatively, the lead wires 138 and 140 may be formed integrally with wire 134, in a manner hereinafter described, and extended coaxially beyond the respective ends of the housing 136. The free ends of the lead wires are adapted to be connected to the bridge circuit 5 for adjustment and calibration and to other standard measuring networks and circuits thereafter. A suitable compactable or compressible mass of solid insulating material 142, such as mica, aluminum oxide, thorium oxide, magnesium oxide, magnesium silicate, forsterite ($2MgO_2$), or any of the insulating plastics which are substantially stable at relatively high temperatures, such, for example, as polymerized tetra-fluoro-ethylene, is disposed within the housing 136 surrounding the fine wire or filament 134. A desirable arrangement for positioning of the filament 134 within the gage is seen in FIGURE 4. It has been found that magnesium silicate ground to a fine powder and fired at approximately 1900° F. for one hour provides an excellent material for use in the gages of the invention. Two or more insulating materials of different coefficients of expansion may be combined in proper proportions to give a desired coefficient of expansion approximating that of the material forming external housing 136. A plurality of insulating washers 144 may be disposed over the lead wires 138 and 140 at each end of the housing to retain the insulating material within the housing.

After the insulating material has been placed around the filament section 134 and around at least a portion of the lead wire extensions 138 and 140 as tightly as possible and the insulating washers 144 are placed in position at the open ends of the external housing 136, this latter housing 136 is drawn or otherwise deformed from its original diameter to a smaller diameter in order to compress the insulating material 142, thereby exerting mechanical pressure on the aforesaid washers 144, the insulating material 142 and the resistance wire or filament 134 embedded therein. This results in the resistance element 134 being clamped over its entire length and surface by the radial pressure of the compressed insulating material 142 surrounding it. The insulation is in turn firmly coupled to the inside surface of the external housing 136 by the compressive force exerted against the housing 136 by the insulating material 142. As a direct consequence of this arrangement any movement of the aforesaid housing 136 is transmitted through the compacted mass of insulation 142 to the resistance element 134. At the same time the resistance element 134 is thermally and electrically insulated from the housing 136. Thus, if the external housing 136 is welded to test specimen 146 by small spot welds (designated by x's in FIGURE 2) or by a continuous weld the entire length thereof and in any event longer than the filament 134 preferably, and a strain is then introduced into the test specimen 146 causing a modification in its dimensions, the dimensions of the housing 136 will undergo a corresponding modification or deformation which will be transmitted through the compressed insulation 142 to the resistance filament 134 effecting a proportionate change in the resistance of the latter element 134.

A preferred commercial embodiment of the gage for use in the present invention involves a modification of the basic gage housing 136, as shown in cross-section in FIGURE 3. The modification comprises, simply, the addition to the housing 136 of the gage, shown in FIGURES 2 and 3, during manufacture, of a thin, flat strip 137 welded to the tubular housing 136 at bottom thereof by small spot welds or by a continuous weld the entire length thereof or any shorter length corresponding to the effective length of the filament 134, and so disposed as to define an extension beyond the sides thereof to provide flat welding surfaces permitting attachment of the gage to a test specimen without the use of special electrodes.

Of course, a great many other variations in the basic design of the strain gage housing 136 may be effected to facilitate weldable mounting of the gage 3 for general use or for specific applications involving test specimens of irregular surface contours and the like. Thus, flanges or weldable mounting surfaces of the gage housing 136 may be perforated or slotted during manufacture to permit riveting of the gage to a test specimen for improving bonding when mounted by welding or soldering. The housing may also be formed of a single piece of sheet steel or other suitable material by folding to form one flange and a central housing and then welding the free ends together to form the other flange. A further alternative permits constructing the housing 136 of a single piece with but one flange suitable for attachment by welding to a test specimen. Too, the central section of the housing containing the resistance wire and insulating material may be pressed into any desired configuration or creased or crimped at one or more points to provide increased compressive contact following assembly of the gage 4.

An illustration of a further modification of a gage housing which is intended to facilitate mounting thereof on test specimens is seen in FIGURE 5, and comprises an elongated tubular envelope 148, the upper portion of which is substantially circular. The lower portion of the housing 148 is provided with integrally formed flanges 148a and 148b on both sides of the main circular housing 148 extending transversely to the axis of the tube. In this arrangement, the resistance element 134, insulating material 142 and insulating retainer washers (not shown) are disposed in the housing as in the embodiment of FIGURE 2 and the housing is then crimped or run through a suitable die which gives it the cross-section illustrated in FIGURE 5, and also causes the insulating material 142 to be compressed against the resistance element in the same manner as effected by the drawing operation described in connection with the embodiment of FIGURES 2 and 3. The flanges 148a and 148b are intended to facilitate attachment of the gage to a test specimen by welding. Thus, the two flanges are welded directly to the surface of the test specimen by suitably spaced spot-welds or single continuous linear welds extending along the entire effective length of the gage, i.e. the length of the resistance filament 134, plus any excess thereof deemed necessary or desirable.

Figure 6:
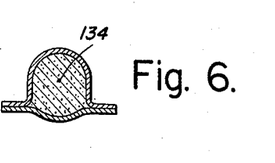

In a similar manner, FIG. 6 illustrates a modified cross-sectional configuration wherein two separate sections 128 and 130, each provided with laterally projecting flanges are welded together or otherwise fastened at the flanged portions so that the resistance element and insulating material are tightly compacted within the housing. Here again, the gage structure can be mounted in a test specimen by welding directly through the flange portions.

Figure 7:
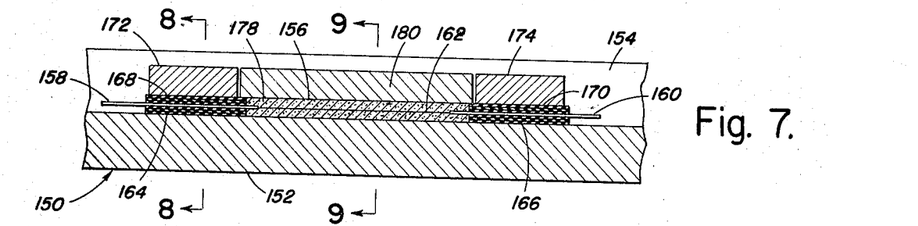
FIGURE 7 is a longitudinal sectional view illustrating another form of strain gage for use in the present invention, and the manner in which the same is attached to a test specimen.
Figure 8:
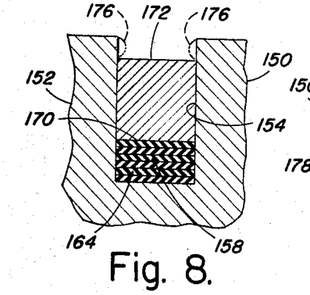
FIGURES 8 and 9 are transverse sectional views taken along lines 8—8 and 9—9, respectively, of FIGURE 7.
Figure 9:
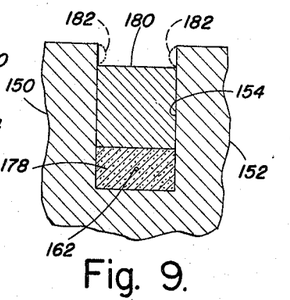

FIGURES 7 to 9 inclusive illustrate an embodiment of the strain gage for use herein in which the external housing 150 comprises a rectangular shaped body 152 having an elongated rectangular groove 154 in its surface. A resistance element 156 comprising two relatively heavy electric leads 158, 160, with a fine gage wire 162 bonded between the lead wires, is disposed within the groove. Each of the lead wires rests on sheets 164, 166 of suitable insulating material, such as mica. Additional sheets 168, 170 of insulating material are placed on top of each of the lead wires. A pair of small rectangular blocks 172, 174 are disposed over the stacks of mica sheets 168 and 170, respectively. These blocks are forced down on the mica sheets by any suitable means such as hammering and are held in position by deformation of the upper edge of the groove adjacent the upper surface of the blocks, as indicated at 176 by the dotted lines in FIG. 8. A powdered insulating material 178, such as mica, is placed in the groove between the two sheet stacks and stamped firmly into the groove. A bar 180 adapted to fit in the groove is disposed over the powdered mica and is hammered and clamped in position in the manner described for the two small blocks. The dotted lines at 182 of FIGURE 9 illustrate how the bar is held in position. With this arrangement, the fine wire is firmly clamped in the powdered mica so that the wire resistance will respond to deformation of the body.

In the embodiment shown in FIGS. 7 through 9 the body can either be the test specimen proper or it can form a suitable housing which is adapted to be bonded to a test specimen. In general, this type of structure finds particular application in permanent installations, wherein a continuous strain measurement or similar physical measurement is required during routine operation of the equipment forming the test specimen, such as for cranes, lifts, and the like.

As pointed out hereinbefore, the housings of the strain gages employed in the practice of the present invention are preferably formed of a material which is readily adaptable to bonding by electric resistance welding or sonic welding. On the other hand, it is equally important to successful operation of the gages that the housing be of minimum structural strength so as to reduce its effect on the normal strain characteristics of the test specimen, and to permit it to be deformed readily under stresses occurring within the test specimen. It has been found that housings formed of thin sheet steel are admirably suited for use in the manufacture of weldable strain gages according to the invention and that such housings may be formed in a variety of configurations to facilitate attachment of the gages to a test specimen by welding while at the same time permitting the housings to be formed of minimum structural strength. In adapting the basic structural characteristics of the gages to conventional welding practices, it is important that the gage housing be such that it will permit positioning of the welding electrodes as close as possible to the actual point or points of weld, thereby to insure the shortest possible path for the welding current and substantially localized heating only, of the gage structure.

Figure 10:
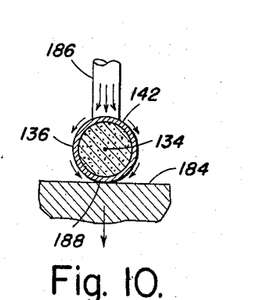
FIGURE 10 is a transverse sectional view illustrating the manner in which a strain gage of the type illustrated in FIGURE 2 can be welded to a metallic test specimen.

For example, with reference to FIGURE 10 of the drawings, there is shown in cross-section, the basic gage configuration of FIGURE 3 positioned for attachment by welding to a test specimen 184. Current from the welding electrode 186 will flow within the tubular housing 136, as indicated by the small arrows in FIGURE 10 entering the test specimen at the weld-point, as indicated by reference numeral 188. Although, it has been found from practical experience that it is entirely possible to spot-weld a gage of plain tubular configuration in the manner illustrated, and to obtain accurate test results with gages mounted in this manner, it has also been found that since the welding electrode 186 must be positioned relatively remote from weld-point 188 in this type of welding operation, unless one employs a special electrode that is adapted to fit around the tubular housing of the gage, there is some danger of damaging the gage through overheating of the tubular walls. Furthermore, it is difficult in this type of welding operation to obtain a high concentration of force at the welding point because of the possibility of crushing the relatively thin tubular housing under the pressure required.

As explained hereinbefore, in the gage structures illustrated in FIGURES 3, 5, and 6, provision is made for attachment of the gage by welding or spot-welding to a test specimen by means of the strip 137 in FIG. 3 or flanges 148a and 148b formed integrally on each side of the lower portion of the housing 148 in FIGS. 5 and 6. With this type of gage housing, the welding electrode can be positioned directly over the respective flanges without excessive heating of the remaining portions of the gage housing and without danger of crushing the central section of the gage housing containing the resistance element. It sometimes occurs with the type of structure illustrated in FIGURE 5, however, that in the die operation or crimping operation employed to compress the insulation about the gage wire or wires and for forming flanges 148a and 148b, a portion of the insulation may be compressed between the flages walls, thereby forming a relatively high resistance path for welding current passing through the flanges to the test specimen.

Figure 11:
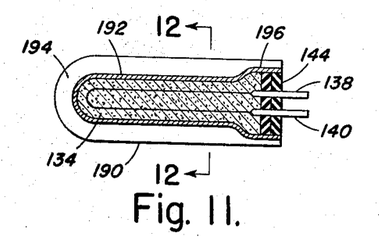
FIGURE 11 is a view, partly in top plan and partly in horizontal section, of a further embodiment of a strain gage which can be employed in the practice of the present invention.
Figure 12:
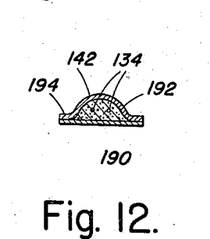
FIGURE 12 is a transverse sectional view taken along lines 12—12 of FIGURE 11.

For certain applications, it is desirable to terminate the gage lead-in wires at one end of the gage housing and in FIGURES 11 and 12 where are shown in sectional plan and cross-sectional views, respectively, a gage of this type. With reference to FIGURES 11 and 12, the gage comprises a substantially flat bottom section 190 and a semi-tubular upper section 192 defining substantially the entire housing for the resistance wire 134 and insulating material 142. The upper section 192 is closed on three sides and is provided with flange sections 194 which are welded or otherwise attached on three sides to the bottom section 190. The gage is formed in the same manner described in copending application Serial No. 754,956 entitled "Improvements in Strain Gages and Installation of the Same," filed Aug. 14, 1958, by the applicant herein. The resistance wire 134 is looped within the housing as shown in FIGURE 11 and is joined to the separate lead-in wires 138 and 140 within the housing, and these leads are then extended externally of the housing at the single open end through suitable insulating washers or retainers 144. The upper section 192 of the gage housing may be dished to a greater depth over the portion housing the lead-in wires, as indicated by reference numeral 196 in FIGURE 11, to accommodate these wires.

A more elaborate method and apparatus for producing the unitary type lead wire-filament assemblies have been described and claimed in copending application Serial No. 669,144 which was filed on July 1, 1957, now abandoned, by the applicant herein.

An additional and significant feature of the strain gages of the present invention is their long-term temperature stability. Since temperature compensation and long-term stability against drift are not always directly related, however, it is desirable in certain instances to forego the ultimate in sensitivity adjustment or temperature compensation to effect enhancement in extended stability of the gage; thus inhibiting excessive drift therein when maintained at a constant temperature for an extended period of time, e.g. several weeks. It has been found that curing of the gage in a suitable manner even at the desired adjustment temperature tends to impart a proper long-term stability thereto. Thus, gages in which the filament is formed of Evenohm wire, of 0.005 to 0.002 in. thickness, undergo a normal curing cycle of approximately ten minutes duration at a filament temperature in the range of 800° F. to 900° F. and preferably of approximately 850° F. for downward adjustment of temperature sensitivity and possess a substantial stability over extended periods up to 700° F.

The temperature range at which downward adjustment occurs is rather limited i.e. 800° F. to 900° F. The procedure is, in addition, relatively slow. However, long term stability to drift at temperatures in excess of 700° F., e.g. up to 900° F., is imparted to the gages of the present invention at the aforesaid adjustment temperature of 850° F. by simple prolongation of the curing cycle, e.g. approximately one to two hours. The upward adjustment in temperature occurs at filament temperatures in the range of 900° F. to 1500° F. and preferably from 1100° F. to 1200° F. Significant, but lessened, long-term stability to drift is attained by a similar prolongation of the curing period at filament temperatures in excess of 1500° F., i.e. up to approximately 2000° F. The power supplies 56, 58, and 60 have, most desirably, variable transformers (Variacs), for adjustment of voltages and filament currents. These are so disposed that the current is sufficiently high to produce the desired shift in bridge balance resistance and temperaure sensitivity, and sufficiently low so that this shift is gradual enough to permit observation and shut-off at a desired value. Further provision for securing a long-term stability against drift is had if the final adjustment temperature compensation is made by lowering the sensitivity thereof to the desired value rather than raising it. This, of course, does not obviate use of the technique wherein the adjustment of the gage is raised to the desired sensitivity value, a procedure which is both conveniently and rapidly performed, but it suggests that it is better to overshift the adjustment values upward and subsequently make the final adjustment in a downward shift.

As noted herein above, the sensitivity thus imparted to the unmounted gage by these above described procedures is a significant and a meaningful one permitting an accurate calibration thereof before use which has been hitherto unknown in strain gage construction. The outer shell of the gages of the class described hereinabove is significant in relation to the instant methods of calibration and adjustment, particularly as regards the temperature coefficient of expansion of this shell or outer housing. Thus, it will be evident that this housing is not a major factor when a gage is mounted on a test specimen since being the weaker of the two in construction, the gage shell follows the underlying structure in the same manner as it would during a change in structure induced by stress. However, when the gage is unmounted, this same shell or housing is not inhibited by the underlying structure of a test specimen, but provides a significant strength to yield a meaningful unmounted sensitivity in the gage itself. Thus, in effect, the gage shell or housing replaces the test specimen in the unmounted state and in this manner provides an ideal structure for obtaining accurate and repeatable unmounted sensitivities. While in the unmounted state the gage housing resists bending and is strong enough to be a controlling factor in the overall expansion rate of the gage, rendering, as noted, an accurate unmounted sensitivity thereto, the relation between unmounted and mounted sensitivity must be known.

Thus, for example, where 304 stainless steel is employed in the gage housing and the test specimen is also 304 stainless steel, unmounted and mounted sensitivities should be substantially identical, since the thermal coefficient of expansion of the gage housing and therefore of the unmounted gage is the same as the test specimen. This being a desirable condition, it will be evident that the unmounted sensitivity of a gage should be as nearly zero as possible when gage shell and test specimen are the same metal so that its mounted sensitivity is as low as possible. Where, then, gages are made of the same metal as the test specimen this condition is substantially achieved. However, where gages are made, for example, of 304 stainless steel and the test specimens on which these gages are to be mounted are made of different metals, the unmounted sensitivity of the gages will have to be adjusted in a substantially direct ratio to the difference in the thermal coefficients of expansion of the gage and test specimen. Illustratively, metals having a coefficient of expansion higher than that of 304 stainless steel require a lowering of the unmounted sensitivity, i.e., a negative unmounted temperature sensitivity; and metals with a lower thermal coefficient of expansion require a more positive unmounted sensitivity. To illustrate further, if a gage with an unmounted sensitivity of zero were mounted on aluminum, the gage would be stretched more in the mounted position with increasing temperature because of the higher rate of expansion of aluminum than that of the gage housing made, again illustratively, of 304 stainless steel. Thus, it would have a high positive sensitivity when welded to aluminum. To obviate this high positive sensitivity, a proper gage to be used on the aluminum should have a compensation of higher negative unmounted sensitivity. Specifically, if a gage having a 304 stainless steel housing is to be used on a test specimen constructed of aluminum, the unmounted sensitivity of the gage should be approximately minus 1500 micro-inches/in./° F. for a temperature change from 100° F. to 600° F., a difference of 500° F., or an average sensitivity of 3 micro-inches/in./° F.

When the gage is to be used on 4130 steel the unmounted sensitivity should be approximately +1000 micro-in./in./° F. for the same 500° F. temperature change, or an average of +2 micro in./in./° F. These figures indicate a difference in the average thermal coefficients of expansion of aluminum and 4130 steel over this range of 5 parts per million/° F. (a difference between −3 and +2 micro-in./in./° F.) which is in substantial agreement with known figures for these coefficients in these temperature ranges.

Since there is a relationship between coefficient of expansion and unmounted sensitivity, this coefficient, if known, can be used to predict the unmounted sensitivity required. In addition, the gage can be used to measure coefficient of expansion. A zero sensitivity in the mounted gage can be attached to the material in question. The mounted sensitivity in micro-in./in./° F. is then a good indication of the difference in expansion coefficients between the 304 stainless shell of the gage and the material in question. If the thermal coefficient of expansion of the 304 is known then the coefficient of expansion of the material to which it is attached is readily computed. Of course, the coefficient for 304 stainless steel can be accurately determined by mounting gages on materials with known thermal coefficients of expansion.

The effectiveness of the compensation may be checked by mounting gages with known unmounted sensitivities on a sample piece of the material to be tested and plotting apparent strain against temperature. Two or three checks may be made before the proper unmounted sensitivity is arrived at. For example, if, on the first attempt, a gage with an unmounted sensitivity of +900 micro-in./in./° F., for a change of 500° F., is mounted and found to have a sensitivity of −200 micro-in./in./° F. for the same temperature change; then, on the next attempt a gage with an unmounted sensitivity of +1100 micro-in./in./500° F. may be tried, i.e. an additional sensitivity of +200 micro-in./in./° F. to counteract the previous −200 micro-in./in./° F. in the first mounted gage. The following is a table showing approximate values of unmounted sensitivities for some common metals:

TABLE I

|  | Micro-in./in./500° F. | Micro-in./in./1° F. |
|---|---|---|
| Titanium | +1,600 | +3 |
| 4130 Steel | +1,000 | +2 |
| 304 Stainless | Zero | |
| Aluminum | −1,500 | −3 |
| Magnesium-Thorium | −2,000 | −4 |

The approximate thermal coefficients of expansions of these metals are listed below:

TABLE II

|  | Parts/Million/° F. (in./in./° F.) | Difference in parts/million/° F. (micro-in./in./° F.) from 304 Stainless Steel |
|---|---|---|
| Titanium | +6 | −3 |
| 4130 Steel | +8 | −2 |
| 304 Stainless | +9 | |
| Aluminum | +13 | +4 |
| Magnesium-Thorium | +15 | +6 |

It can be seen that, if 304 stainless is employed in the gage shell or housing the unmounted sensitivities are in approximately inverse ratio to the termal coefficients of expansion.

It should be noted that some alloys possess a wide variety of thermal coefficients of expansion depending on the heat treatment. Thus, an error of over 1000 micro-in/in./°F. for a 500° F. change can be introduced by this factor so there is no substitute for using a sample of material which is identical to the test structure, not only in composition but in heat treatment as well, on which to mount and calibrate gages to arrive at the proper unmounted sensitivity.

Where 120 ohm gages are being adjusted as described hereinabove the voltages conducted to and across the bridge circuit 5 will vary with the battery or power source connected to the bridge. The power source employed varies in turn, with whether the sensitivity is to be raised or lowered. Thus, where it is to be lowered the power source 58 is connected to the bridge and imparts a voltage to the bridge of approximately 31.0 volts direct current (D.C.); the voltage across the gage 4 is then about 15.5 volts and the gage (4) current is in the order of 130 milliamperes (ma.). When the power source 60 is connected for upward adjustment of gage sensitivity the voltage is even greater, being about 36.5 volts D.C. The corresponding voltage across the gage 4 is thus about 18.25 volts and the current 153 ma. in this instance. The X–Y plot employs a noticeably lessened voltage. The voltage conducted to and across the bridge circuit 5 from the power source 56 is thus about 4.7 volts D.C. and concomitantly that across the gage 4 is about 2.35 volts. The current across the gage 4 is, of course, also materially reduced, i.e. 20 ma. The gage 4 resistance $R_4$, remains the same, of course, and is 119.7 ohms in each instance.

It will be noted that the sensitivity of the bridge balancing system (i.e. the Brown Electronic Potentiometer) 16 is increased in direct proportion to the bridge voltage so that a desirable increase in sensitivity is attained during the curing process. It will also be noted, as indicated above, that there is an ignored change in the bridge balance for a very short period after the gage is subjected to the high current. This represents the shift in resistance caused by the actual bringing up to temperature of the filament. It is not a permanent change and will reverse if the temperature is dropped back immediately, i.e. returned to the original room temperature conditions. The permanent change in resistance which occurs after the gage has attained an elevated but even temperature in the oven 12 is that which is significant. This is supported by an observation at ambient temperature of the bridge balance before and after each curing cycle. The shifting currents are not alike for all pages. Folded element gages (see FIG. 11), for example, require less current than straight-through filaments, as shown in FIGURE 2, due, probably to the more concentrated heat source and the less shell or housing surface for the wattage involved.

It is interesting to note that the filament current and voltage conducted to the gage 4 and the bridge circuit 5 used for upward shifting of page sensitivity can also be employed in effecting a downward shift in gage sensitivity. This will be evident when it is noted that in increasing the filament current temperature to effect an upward shift in sensitivity, the gage filament must be passed through the lower range referred to above, i.e. 800° F. to 900° F. and that if this transition to higher temperature is sufficiently gradual, the increase in resistance will be effected in this lower range. Of course, as the temperature gradient is increased in the higher ranges, reversal in the sensitivity will occur.

The weldable strain gage employed and described herein can also be used for temperature measurement by adjusting its temperature sensitivity to a known high value rather than a low value.

It is also noted that the adjustment system of the present invention can be readily automated through the Y-axis motion or apparent strain of the X-Y recorder 3 which can be readily disposed to fit a switch on the dial 20 of the potentiometer 16, so that the sensitivity adjustment current or voltage is turned off when the proper change in resistance is attained.

Similarly, the proper upward or downward adjustment current selected from the power sources 58 and 60 can be automatically pre-selected by this same Y-axis motion. Thus, if the Y-axis motion or apparent strain plot is above a desired point, a relay is locked to select a lower current.

It is noted that the voltages of the power sources 58 and 60 may be increased to effect adjustment of mounted gages, as well, by the process herein described. The increased filament current thus effected is necessary for proper adjustment because of the increased heat dissipation caused by conduction in the mounted state. This process can also be used to adjust the resistance rather than the temperature sensitivity of strain gages.

Thus, it will be evident that there is provided by the present invention, a temperature compensated weldable wire resistance strain gage accurately adjusted and calibrated in its unmounted state, by filament current means; which means provide rapid and facile methods for effecting the preparation of the aforesaid gages and which, in addition, are capable of many and broad applications.

What is claimed is:

1. Method for producing inherent temperature compensation within an unmounted strain gage composed of a strain responsive filament coupled through an electrical insulating material to a metallic support; that comprises establishing said strain gage at an elevated temperature, measuring the temperature sensitivity of said gage at said elevated temperature, and passing an electric current through the filament of said gage sufficient to effect a shift in temperature sensitivity therein with reference to its measured value.

2. Method for producing inherent temperature compensation within an unmounted strain gage composed of a strain responsive resistance filament coupled through an electrical insulating material to a metallic support; that comprises securing said gage in a fixed position; establishing said strain gage at an elevated temperature; sensing and measuring the temperature sensitivity of said gage at said elevated temperature; and passing an electric current through the filament of said gage sufficient to effect a permanent shift in temperature sensitivity therein with reference to its measured value.

3. Method for producing inherent temperature compensation within an unmounted strain gage composed of a strain responsive resistance filament coupled through an electrical insulating material to a metallic support; that comprises establishing the filament of said gage in an electrical circuit and heating said gage filament to an elevated temperature, and connecting said filament and said circuit to a conservative electric current source, for the purpose of passing a current therethrough to sense and indicate the temperature sensitivity of said gage filament, thereafter substituting an adjusting current source in said circuit and passing said adjusting current through the filament of said gage sufficient to effect a shift in temperature sensitivity therein with reference to its measured value.

4. Method for producing inherent temperature compensation within an unmounted strain gage composed of a strain responsive resistance filament coupled through an electrical insulating material to a metallic support; that comprises establishing the filament of said gage in an electrical circuit and heating said gage filament to an elevated temperature, and connecting said filament and said circuit to a conservative electric current source for the purpose of passing a current therethrough to sense and indicate the temperature sensitivity of said gage filament, thereafter substituting an adjusting current source in said circuit for said conservative current source, and passing said adjusting electric current through the filament of said gage in order to induce a current temperature in said filament of from 800° F. to 900° F. to shift the temperature sensitivity of said gage filament downwardly and permanently with reference to the indicated value.

5. Method for producing inherent temperature compensation within an unmounted strain gage composed of a strain responsive resistance filament coupled through an electrical insulating material to a metallic support; that comprises establishing the filament of said gage in an electrical circuit and heating said gage filament to an elevated temperature, and connecting said filament and said circuit to a conservative electric current source for the purpose of passing a current therethrough to sense and indicate the temperature sensitivity of said gage filament, thereafter substituting an adjusting current source in said circuit for said conservative current source, and passing said adjusting electric current through the filament of said gage in order to induce a current temperature in said filament of from 900° F. to 2000° F. to shift the temperature sensitivity of said gage filament upwardly and permanently with reference to the indicated value.

6. Method for producing an unmounted temperature compensated weldable strain gage which comprises providing an elongated resistance filament, the resistance of which changes in accordance with forces applied longitudinally thereto, applying to the surface of said filament a continuous, solid, adherent covering of electrical insulating material, disposing the resulting insulation-covered, resistance filament within a metal shell, and permanently deforming said shell inwardly against said insulating material and thereby clamping the insulating material firmly between said shell and said resistance filament, whereby the resistance filament is mechanically coupled to the shell to receive, via insulating material, forces applied longitudinally to the shell; establishing the strain gage thus formed at an elevated temperature, sensing and measuring the temperature sensitivity of said gage at said elevated temperature, and passing an electrical current through the filament of said gage sufficient to effect a shift in temperature sensitivity therein with reference to its measured value.

7. The method for producing an unmounted temperature compensated weldable strain gage which comprises providing an elongated resistance filament the resistance of which changes in accordance with forces applied longitudinally thereto, applying to the surface of said filament a continuous, solid, adherent covering of electrical insulating material, disposing the resulting insulation-covered resistance filament within a metal shell, and permanently deforming said shell inwardly against said insulating material and thereby clamping the insulating material firmly between said shell and said resistance filament, whereby the resistance filament is mechanically coupled to the shell to receive, via said insulating material, forces applied longitudinally to the shell; welding a thin, flat metallic strip to the bottom of said housing in such a manner as to define an extension beyond the sides thereof to provide flat welding surfaces to permit attachment of said gage to a test specimen securing said gage in a fixed position; heating said gage to an elevated temperature; sensing and measuring the temperature sensitivity of said gage at said elevated temperature, and passing an electrical current through the filament of said gage sufficient to effect a permanent shift in temperature sensitivity therein with reference to its measured value.

References Cited

UNITED STATES PATENTS

| | | | |
|---|---|---|---|
| 2,935,709 | 5/1960 | Paine | 338—2 |
| 2,977,557 | 3/1961 | Bleiberg et al. | 338—7 |
| 2,994,847 | 8/1961 | Vodar | 29—620 X |

OTHER REFERENCES

Belser and Hicklin: Temperature Coeffcients of Resistance of Metallic Films in the temperature range 25° to 600° C., Journal of Applied Physics, vol. 30, No. 3, March 1959, pp. 313–322.

JOHN F. CAMPBELL, *Primary Examiner.*

J. CLINE, *Assistant Examiner.*